(12) United States Patent
Radomski et al.

(10) Patent No.: US 10,344,774 B2
(45) Date of Patent: Jul. 9, 2019

(54) CASING FOR A GAS TURBINE ENGINE AND A METHOD OF MANUFACTURING SUCH A CASING

(71) Applicant: ROLLS-ROYCE plc, London (GB)

(72) Inventors: Steven A Radomski, Derby (GB); Simon Read, Derby (GB)

(73) Assignee: ROLLS-ROYCE plc, London (GB)

( * ) Notice: Subject to any disclaimer, the term of this patent is extended or adjusted under 35 U.S.C. 154(b) by 372 days.

(21) Appl. No.: 15/256,099

(22) Filed: Sep. 2, 2016

(65) Prior Publication Data
US 2017/0089358 A1  Mar. 30, 2017

(30) Foreign Application Priority Data
Sep. 29, 2015  (GB) .................................. 1517171.3

(51) Int. Cl.
| | | |
|---|---|---|
| *F04D 29/52* | (2006.01) | |
| *F01D 21/04* | (2006.01) | |
| *F01D 25/24* | (2006.01) | |

(52) U.S. Cl.
CPC ......... *F04D 29/522* (2013.01); *F01D 21/045* (2013.01); *F01D 25/24* (2013.01); *F04D 29/526* (2013.01); *F05B 2220/302* (2013.01); *F05B 2230/232* (2013.01); *F05B 2230/60* (2013.01); *F05B 2260/96* (2013.01); *F05B 2280/6012* (2013.01); *F05D 2230/51* (2013.01); *F05D 2230/54* (2013.01); *F05D 2250/75* (2013.01); *F05D 2260/36* (2013.01); *F05D 2300/612* (2013.01)

(58) Field of Classification Search
CPC .... F04D 29/522; F04D 29/526; F01D 21/045; F01D 25/24
See application file for complete search history.

(56) References Cited

U.S. PATENT DOCUMENTS

| | | | | |
|---|---|---|---|---|
| 2,994,508 A | * | 8/1961 | Howald | F01D 9/042 415/190 |
| 3,338,508 A | * | 8/1967 | Castle | F01D 9/044 415/209.1 |
| 4,452,335 A | * | 6/1984 | Mathews | F02C 7/24 181/214 |

(Continued)

FOREIGN PATENT DOCUMENTS

EP  0 528 520 A1  2/1993

OTHER PUBLICATIONS

Feb. 10, 2016 Search Report issued in British Patent Application No. GB1517171.3.

*Primary Examiner* — David E Sosnowski
*Assistant Examiner* — Maranatha Boardman
(74) *Attorney, Agent, or Firm* — Oliff PLC

(57) ABSTRACT

A gas turbine engine casing comprising: an inner circumferential wall; an outer circumferential wall spaced radially outwardly from the inner wall; wherein the inner and outer circumferential walls are formed by an axially repeating profile comprising an inner wall portion and an outer wall portion connected to one another by an intermediate portion, the axially repeating profile being arranged such that the inner wall portion abuts against and is connected to an adjacent inner wall portion to form the inner circumferential wall and the outer wall portion abuts against and is connected to an adjacent outer wall portion to form the outer circumferential wall.

15 Claims, 3 Drawing Sheets

(56) References Cited

U.S. PATENT DOCUMENTS

| | | | | |
|---|---|---|---|---|
| 4,699,567 A * | 10/1987 | Stewart | F01D 21/045 | 415/121.2 |
| 4,796,423 A * | 1/1989 | Lievestro | F01D 9/04 | 403/209 |
| 5,197,856 A * | 3/1993 | Koertge | F01D 25/246 | 415/199.4 |
| 5,513,949 A * | 5/1996 | Armstrong | F01D 21/045 | 415/200 |
| 6,206,631 B1 * | 3/2001 | Schilling | F01D 21/045 | 415/173.4 |
| 6,575,694 B1 * | 6/2003 | Thompson | F01D 21/045 | 415/173.4 |
| 6,638,008 B2 * | 10/2003 | Sathianathan | F01D 21/045 | 415/214.1 |
| 6,638,012 B2 * | 10/2003 | Bekrenev | F01D 11/08 | 415/115 |
| 6,991,427 B2 * | 1/2006 | Scott | F01D 9/04 | 415/173.4 |
| 7,334,984 B1 * | 2/2008 | Stine | F01D 11/127 | 415/173.1 |
| 7,402,022 B2 * | 7/2008 | Harper | F01D 21/045 | 415/214.1 |
| 8,220,588 B2 * | 7/2012 | Thrash | B64D 29/00 | 181/292 |
| 9,260,859 B2 * | 2/2016 | Matan | E04B 1/84 | |
| 10,119,547 B2 * | 11/2018 | Rautenstrauch | F04D 19/022 | |
| 2005/0042077 A1 * | 2/2005 | Gekht | F01D 9/04 | 415/116 |
| 2013/0177400 A1 * | 7/2013 | Ring | F01D 9/042 | 415/119 |
| 2013/0259664 A1 * | 10/2013 | Denis | B23K 31/02 | 415/182.1 |
| 2015/0159554 A1 * | 6/2015 | Cretin | F01D 25/243 | 137/15.01 |
| 2015/0300373 A1 * | 10/2015 | Muller | F04D 19/002 | 417/423.15 |

* cited by examiner

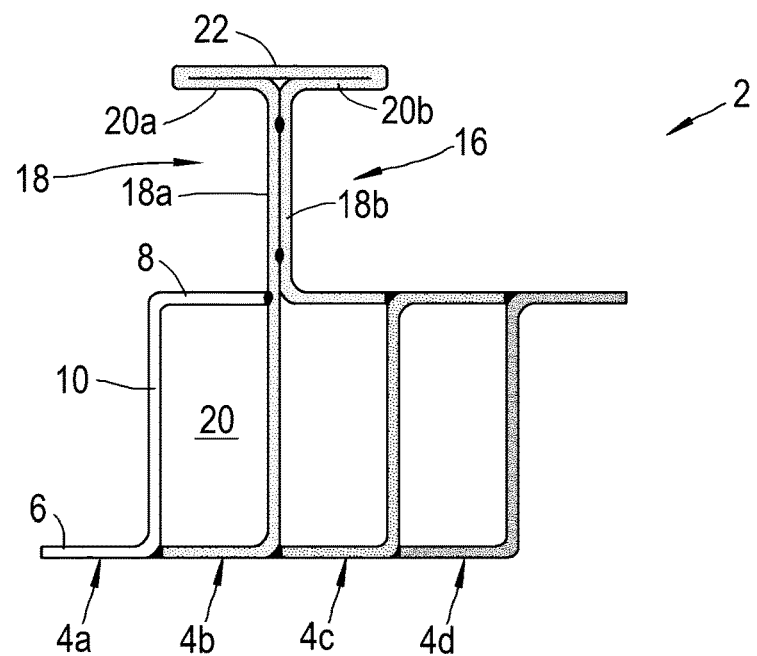
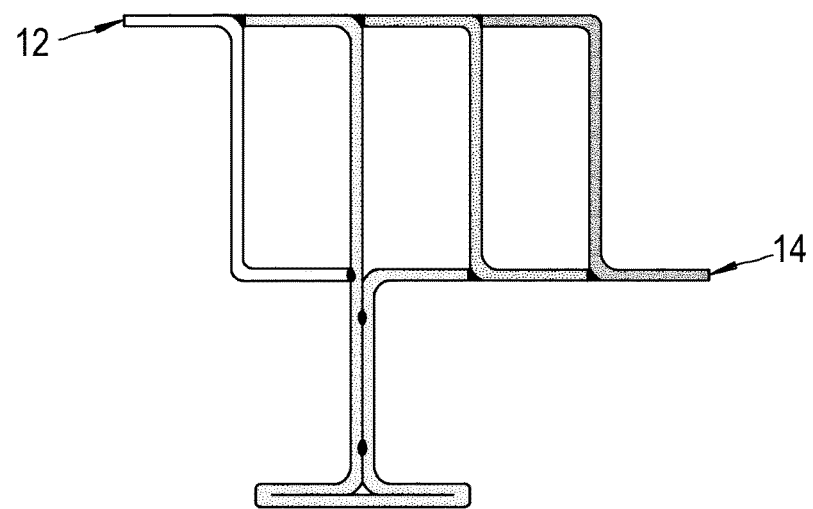

Fig.3
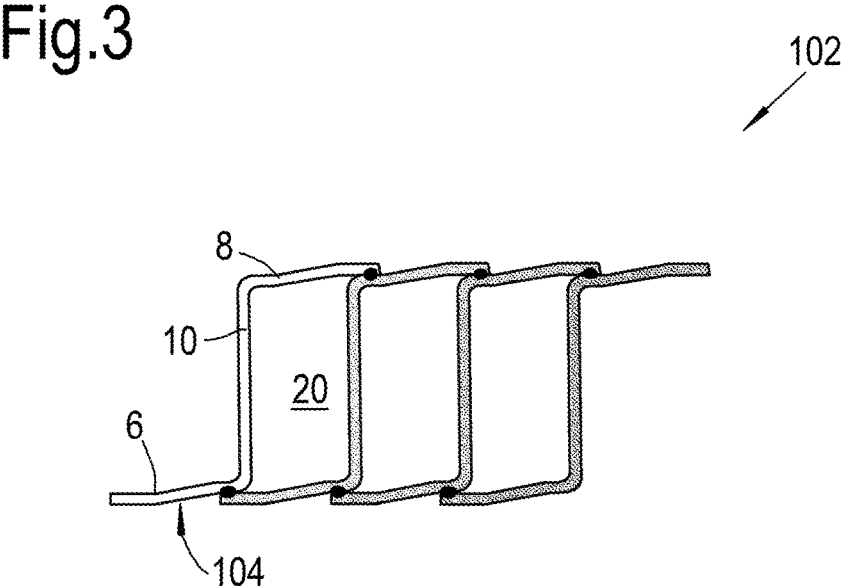
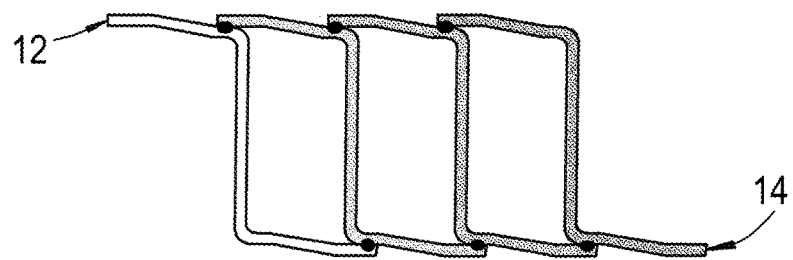

CASING FOR A GAS TURBINE ENGINE AND A METHOD OF MANUFACTURING SUCH A CASING

CROSS-REFERENCE TO RELATED APPLICATIONS

This application is based upon and claims the benefit of priority from British Patent Application Number GB1517171.3 filed 29 Sep. 2015, the entire contents of which are incorporated by reference.

BACKGROUND

1. Field of the Disclosure

The disclosure relates to a casing for a gas turbine engine and particularly, but not exclusively, to a fan case. Also described is a method of manufacturing such a casing.

2. Description of the Related Art

The fan case of a gas turbine engine defines the outer gas path of the engine. It must also be capable of containing a fan blade in the event of a fan blade-off (FBO).

Metallic fan cases are generally machined from oversized ring rolled forgings. To improve the stiffness/weight ratio of the cases, stiffening ribs can be added to the outside of the casing, allowing the barrel wall thickness to be reduced.

Such metallic fan cases generally are seen as having a poor Buy-to-Fly ratio (the weight ratio between the raw material used for a component and the weight of the component itself). The addition of external stiffeners/ribs to reduce the casing weight has a negative impact on the forging input weight which generally makes the Buy-to-Fly ratio of the forging even worse.

Forming the case using a ring rolled forging is also extremely laborious, typically taking over a year to procure and machine ready for dressing.

OBJECTS AND SUMMARY

The fan case dominates the fan module weight and forms around 10% of the total dressed engine weight. Therefore, optimisation of the fan case in order to reduce weight is of paramount importance. However, with the current method of manufacture, a reduction in weight is typically linked to an increase in cost.

It is therefore desirable to devise an engine casing design which overcomes or alleviates these issues.

In accordance with an aspect of the disclosure, there is provided a gas turbine engine casing comprising: an inner circumferential wall; an outer circumferential wall spaced radially outwardly from the inner wall; wherein the inner and outer circumferential walls are formed by an axially repeating profile comprising an inner wall portion and an outer wall portion connected to one another by an intermediate portion, the axially repeating profile being arranged such that the inner wall portion abuts against and is connected to an adjacent inner wall portion to form the inner circumferential wall and the outer wall portion abuts against and is connected to an adjacent outer wall portion to form the outer circumferential wall.

The intermediate portion may be integral with the inner wall portion and the outer wall portion. Thus, the intermediate portion may be formed as a single component with the inner wall portion and the outer wall portion. There may be no mechanical fixtures holding the intermediate portion to the inner circumferential wall (or inner wall portion) or the outer circumferential wall (or outer wall portion). The inner wall portion, outer wall portion and intermediate portion may be formed as a unitary part and/or may be inseparable from each other (for example, it may not be possible to separate them from one another in a manner that allows them to be reassembled in the same manner).

The inner wall portion, outer wall portion and intermediate portion may extend around the same circumferential extent as one another. For example, the inner wall portion, outer wall portion and intermediate portion may each extend around 360 degrees, for example where the axially repeating profile is formed by a plurality of rings. By way of further example, the inner wall portion, outer wall portion and intermediate portion may each extend around more than 360 degrees, for example 720 degrees, 1080 degrees, 1440 degrees or indeed any multiple of 360 degrees, for example where the axially repeating profile is formed by a strip element that is helically wound such that the inner and outer portions of adjacent loops abut against one another.

In any arrangement, the inner wall portion, outer wall portion, and intermediate portion may each extend around at least 360 degrees and/or may each extend around the same circumferential extent as one another.

The axially repeating profile may be formed by a strip element comprising the inner wall portion, the outer wall portion and the intermediate portion, the strip element being helically wound such that the inner and outer portions of adjacent loops abut against one another.

The axially repeating profile may be formed by a plurality of rings arranged in axial series, each ring comprising an inner wall portion, an outer wall portion and an intermediate portion.

One of the more of the plurality of rings may comprise a stiffening rib.

A cavity may be formed between (or by) the axially repeating profile. Such a cavity may be said to be formed between the inner and outer walls.

The cavity may be filled with a foam material. The foam may provide fire resistance, impact energy absorption, and/or sound attenuation.

The inner wall portions and/or the outer wall portions may be welded to one another.

The inner wall portions and/or the outer wall portions may be mechanically interconnected.

The inner wall portion, the outer wall portion and/or the intermediate portion may comprise complementary features which form a snap-fit connection. This may allow the axially repeating profile to be held in place prior to performing a process (e.g. welding) which fixedly connects the adjacent inner wall portions and the adjacent outer wall portions.

In accordance with another aspect of the disclosure, there is provided a method of manufacturing a gas turbine engine casing as described above, the method comprising: arranging the axially repeating profile such that the inner wall portion abuts against an adjacent inner wall portion and the outer wall portion abuts against an adjacent outer wall portion; and connecting the adjacent inner wall portions and the adjacent outer wall portions together to form the inner and outer circumferential walls.

The inner wall portion, the outer wall portion and/or the intermediate portion may comprise complementary features which form a snap-fit connection, and the method may further comprise: assembling the axially repeating profile such that the snap-fit connection holds the adjacent inner wall portions and the adjacent outer wall portions against one another; and then fixedly connecting the adjacent inner wall portions and the adjacent outer wall portions to one another.

The adjacent inner wall portions and/or the adjacent outer wall portions may be welded to one another.

The axially repeating profile may be formed by folding sheet material to form the inner wall portion, the outer wall portion and the intermediate portion.

BRIEF DESCRIPTION OF THE DRAWINGS

For a better understanding of the disclosure, and to show more clearly how it may be carried into effect, reference will now be made, by way of example, to the accompanying drawings, in which:

FIG. 2 is a cross-section of a casing for a gas turbine engine according to an embodiment of the disclosure; and FIG. 3 is a cross-section of a casing for a gas turbine engine according to another embodiment of the disclosure.

DETAILED DESCRIPTION OF EMBODIMENTS

Figure 1:
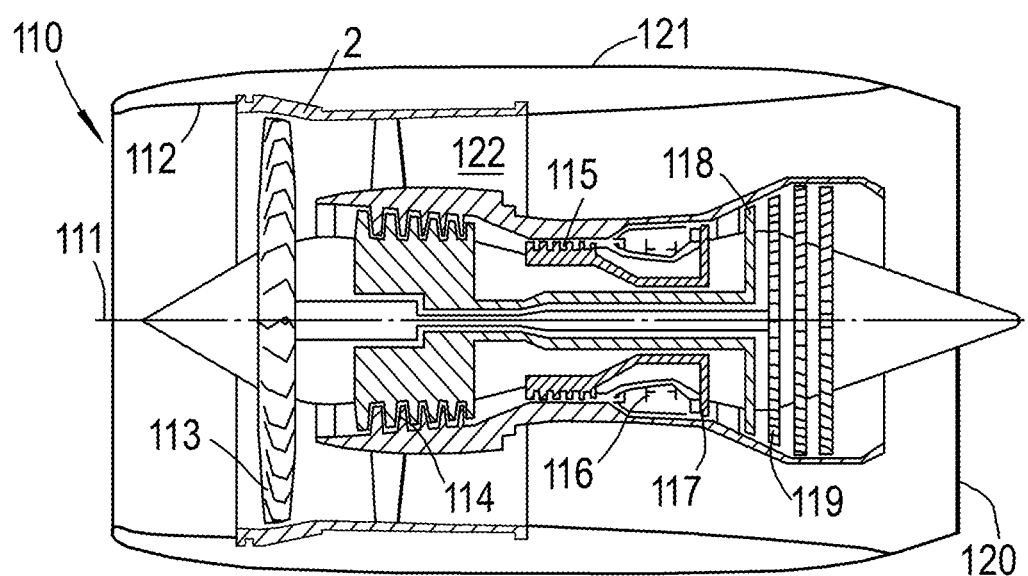
FIG. 1 is a sectional side view of a gas turbine engine.

With reference to FIG. 1, a gas turbine engine is generally indicated at 110, having a principal and rotational axis 111. The engine 110 comprises, in axial flow series, an air intake 112, a propulsive fan 113, an intermediate pressure compressor 114, a high-pressure compressor 115, combustion equipment 116, a high-pressure turbine 117, an intermediate pressure turbine 118, a low-pressure turbine 119 and an exhaust nozzle 120. A nacelle 121 generally surrounds the engine 110 and defines both the intake 112 and the exhaust nozzle 120.

The gas turbine engine 110 works in the conventional manner so that air entering the intake 112 is accelerated by the fan 113 to produce two air flows: a first air flow into the intermediate pressure compressor 114 and a second air flow which passes through a bypass duct 122 to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture combusted. The resultant hot combustion products then expand through, and thereby drive the high, intermediate and low-pressure turbines 117, 118, 119 before being exhausted through the nozzle 120 to provide additional propulsive thrust. The high 117, intermediate 118 and low 119 pressure turbines drive respectively the high pressure compressor 115, intermediate pressure compressor 114 and fan 113, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The gas turbine engine 110 also has a casing 2, illustrated in FIG. 1 as being a fan casing 2 that surrounds the fan 113. FIG. 2 shows the casing 2 of a gas turbine engine 110 in greater detail. The casing 2 comprises a plurality of discrete rings 4a-4d which are arranged in axial series.

As shown, each of the rings 4a-4d comprises an inner (wall) portion 6, an outer (wall) portion 8 and an intermediate portion 10. The inner and outer portions 6, 8 are arranged parallel to one another and extend substantially in an axial direction. The inner and outer portions 6, 8 are spaced from one another in a radial direction by the intermediate portion 10 which is substantially perpendicular to the inner and outer portions 6, 8. The inner, outer and intermediate portions 6, 8, 10 extend around the entire circumference of the ring 4a-4d.

The rings 4a-4d may be formed from sheet material which is bent or folded to form the inner, outer and intermediate portions 6, 8, 10. Specifically, a portion running along each edge of the sheet material may be folded in opposite directions by 90° (although other angles may be used) to form the inner and outer portions 6, 8. Alternatively, the profile of the rings 4a-4d may be machined.

The rings 4a-4d are arranged such that the inner portions 6 of the rings 4a-4d are aligned to form a substantially continuous inner wall 12 of the casing 2. Similarly, the outer portions 8 of the rings 4a-4d are aligned to form a substantially continuous outer wall 14 of the casing 2.

The inner portion 6 of each ring 4a-4d is connected to the inner portion 6 of an adjacent ring 4a-4d. Specifically, as shown, the inner portion 6 of the ring 4a is connected to the inner portion 6 of the ring 4b, the inner portion 6 of the ring 4b is connected to the inner portion 6 of the ring 4c, and the inner portion 6 of the ring 4c is connected to the inner portion 6 of the ring 4d.

Similarly, the outer portion 8 of each ring 4a-4d is connected to the outer portion 8 of an adjacent ring 4a-4d. Specifically, as shown, the outer portion 8 of the ring 4a is connected to the outer portion 8 of the ring 4b, the outer portion 8 of the ring 4b is connected to the outer portion 8 of the ring 4c, and the outer portion 8 of the ring 4c is connected to the outer portion 8 of the ring 4d.

The adjacent inner portions 6 and the adjacent outer portions 8 may be connected to one another using a welding process, which may be automated using robots. As described previously, the adjacent inner portions 6 and the adjacent outer portions 8 are arranged so that they lie parallel to one another and abut against one another, allowing a butt weld to be made. Alternatively, the adjacent inner portions 6 and the adjacent outer portions 8 may overlap to form a lap joint. The inner portions 6 and the outer portions 8 may be welded with a double headed welding torch, with one head located within the casing 2 and the other head located externally to the casing 2. The inner and outer portions 6, 8 can therefore be welded simultaneously. A fusion welding process, such as laser or electron beam welding may be used, with the weld being applied as a continuous weld or stitch weld.

One or more of the rings 4a-4d may be provided with a stiffening rib 16 which projects outwards from the outer wall 14. In particular, in FIG. 2, the ring 4b is provided with a stiffening rib 16. The stiffening rib 16 is formed by lengthening the intermediate portion 10 such that it extends past the level of the outer wall 14 and is formed into a circumferential flange 18 before returning to form the outer portion 8.

Specifically, the intermediate portion 10 extends past the level of the outer wall 14 to form a first upstand section 18a and is then folded by 90° (anticlockwise, as labelled in the upper section of FIG. 2) so as to form a first lower flange portion 20a. The first lower flange portion 20a is folded back on itself (by 180°, clockwise) to form an outer flange surface 22 which runs parallel to the first lower flange portion 20a. The outer flange surface 22 is approximately twice the length of the first lower flange portion 20a such that it extends past the first upstand section 18a by a distance which is approximately equal to the first lower flange portion 20a. The outer flange surface 22 is again folded back on itself (by 180°, clockwise) to form a second lower flange portion 20b. The second lower flange portion 20b extends axially back towards the first upstand section 18a where it is folded by 90° (anticlockwise) so as to form a second upstand section 18b which returns to the level of the outer wall 14 where it is folded by 90° (anticlockwise) to form the outer portion 8. As shown, the first and second upstand sections 18a, 18b may be connected to one another by welding or the like.

Alternatively, or in addition, one or more of the rings 4a-4d may be provided with features which project inwards from the inner wall 12. For example, one or more of the rings 4a-4d may be provided with liner fitting fixtures which can be used to attach a liner to the casing 2.

A cavity 20 is formed between the profiles of the adjacent rings 4a-4d. For example, between the rings 4a, 4b, the cavity 20 is formed between the intermediate portions 10 of the rings 4a, 4b, the outer portion 8 of ring 4a and the inner portion 6 of ring 4b. The cavities may be filled with a foam, that provides fire resistance, impact energy absorption, and/or sound attenuation. The foam may be a structural foam which is supplied in rings having an inner diameter greater than or equal to the outer diameter of the inner portion 6 and an outer diameter less than or equal to the inner diameter of the outer portion 8, and having a thickness which is less than or equal to the length of the inner and outer portions 6, 8. The foam rings can therefore be received between adjacent rings 4a-4d during the assembly process. Alternatively, the foam may be injected into the cavities 20 after assembly of the rings 4a-4d. To aid introduction of such foams, the intermediate portions 10 may be discontinuous (i.e. have openings) so as to connect the cavities 20.

Although FIG. 2 shows only four rings 4a-4d, it will be appreciated that this number may vary depending on the required length of the casing 2 versus the length of each ring.

Alternatively, as shown in FIG. 3, the casing 102 may be formed by a single, continuous, helically-wound strip element 104. The element 104 has a profile which again comprises the inner portion 6, the outer portion 8 and the intermediate portion 10. The element 104 is wound in a spiral or helix such that the inner and outer portions 6, 8 of adjacent loops overlap with one another to form the inner and outer walls 12, 14. The adjacent inner and outer portions 6, 8 are again connected to one another using a welding process, for example. In particular, with this arrangement, the weld can be performed as a single helical pass.

The arrangements described previously allow a casing of a gas turbine engine, such as a fan case, to be manufactured from sheet material, using repeating formed, folded or machined sections. As a result, there is minimal waste material in the manufacturing process such that the Buy-to-Fly ratio is very high.

It has been shown that the axially repeating profile can be formed from a material having a reduced thickness, while still producing an equivalent crush (impact) strength, when compared to a ring rolled forging. Specifically, the axially repeating profile allows the material thickness to be reduced by approximately half. The arrangement therefore significantly reduces the weight of the casing (or increases the strength). If desired, this weight reduction may be offset somewhat by using a cheaper, but heavier material. For example, the casing may be constructed from steel instead of titanium, as is typically used. Steel is readily formable and weldable and has good ductility. However, where desired, titanium, aluminium and other materials may also be used.

It will be appreciated that the inner and/or outer portions 6, 8 may connect to what is described previously as the intermediate portion 10, rather than the adjacent inner and outer portions 6, 8. In this instance, the inner and outer portions 6, 8 may be considered to comprise a section of the radially extending portion, with the intermediate portion 10 being defined as the portion in-between the joints.

Although the inner and outer walls 12, 14 have been described as running parallel to one another and the centreline of the casing, they may instead converge or diverge from one another and/or the centreline (i.e. axially) of the casing 2. Nevertheless, the general profile of the inner, outer and intermediate portions 6, 8, 10 repeats axially along the length of the casing. In particular, with the arrangement shown in FIG. 3, the internal and external diameters of the casing 102 may be adjusted such that the casing 102 tapers along its length by altering the amount which the inner and outer portions 6, 8 overlap.

The adjacent inner and outer portions 6, 8 may be joined in other manners than those described previously, and may include mechanical interconnections, such as crimping. The rings 4a-4d or strip element 104 may also include cooperating features which temporarily connect the rings 4a-4d or adjacent loops of the strip element 104 together prior to welding or the like. For example, the distal end of each inner and outer portion 6, 8 may be provided with a lip or rim which engages in a complementary groove at a proximal end (i.e. adjacent the intermediate portion 10) of an adjacent inner or outer portion 6, 8 to form a snap-fit connection. However, it will be appreciated that other forms of snap-fit connection may be used. For example, the position of the lip and groove may be reversed. The snap-fit connection may also be formed between the intermediate portions 10.

It will be appreciated that a separate cover piece may be attached to the axially repeating profile at each end of the casing. The separate cover pieces may be used to form an aerodynamically efficient leading and trailing edge and need not have inner, outer and intermediate portions.

The invention is not limited to the embodiments described herein, and may be modified or adapted without departing from the scope of the present invention.

We claim:

1. A gas turbine engine casing comprising:
an inner circumferential wall;
an outer circumferential wall spaced radially outwardly from the inner wall;
wherein the inner and outer circumferential walls are formed by an axially repeating profile comprising an inner wall portion and an outer wall portion connected to one another by an intermediate portion, the axially repeating profile being arranged such that the inner wall portion abuts against and is connected to an adjacent inner wall portion to form the inner circumferential wall and the outer wall portion abuts against and is connected to an adjacent outer wall portion to form the outer circumferential wall, and
wherein the outer wall portion extends axially from the intermediate portion in an opposite direction from an extension direction of the inner wall portion from the intermediate portion.

2. A gas turbine engine casing according to claim 1, wherein the intermediate portion is integral with both the inner wall portion and the outer wall portion.

3. A gas turbine engine according to claim 1, wherein the inner wall portion, outer wall portion and intermediate portion all extend around the same circumferential extent.

4. A gas turbine engine according to claim 1, wherein the inner all portion, outer wall portion and intermediate portion all extend circumferentially around at least 360 degrees.

5. A gas turbine engine casing according to claim 1, wherein the axially repeating profile is formed by a strip element comprising the inner wall portion, the outer wall portion and the intermediate portion, the strip element being helically wound such that the inner and outer portions of adjacent loops of the helically wound strip element abut against one another.

6. A gas turbine engine casing as claimed in claim 1, wherein the axially repeating profile is formed by a plurality of rings arranged in axial series, each ring comprising respective ones of the inner wall portion, the outer wall portion and the intermediate portion.

7. A gas turbine engine casing as claimed in claim 6, wherein one or more of the plurality of rings comprises a stiffening rib.

8. A gas turbine engine casing as claimed in claim 1, wherein a cavity is formed between adjacent axially repeating profiles.

9. A gas turbine engine casing as claimed in claim 8, wherein the cavity is filled with a foam material.

10. A gas turbine engine casing as claimed in claim 1, wherein adjacent inner wall portions are welded to one another and/or adjacent outer wall portions are welded to one another.

11. A gas turbine engine casing as claimed in claim 1, wherein adjacent inner wall portions are mechanically interconnected and/or adjacent outer wall portions are mechanically interconnected.

12. A gas turbine engine comprising a casing as claimed in claim 1.

13. A method of manufacturing a gas turbine engine casing as claimed in claim 1, the method comprising:
arranging the axially repeating profile such that the inner wall portion abuts against an adjacent inner wall portion and the outer wall portion abuts against an adjacent outer wall portion; and
connecting the adjacent inner wall portions and the adjacent outer wall portions together to form the inner and outer circumferential walls.

14. A method as claimed in claim 13, wherein the adjacent inner wall portions and/or the adjacent outer wall portions are welded to one another.

15. A method as claimed in claim 13, wherein the axially repeating profile is formed by folding sheet material to form the inner wall portion, the outer wall portion and the intermediate portion.

* * * * *